United States Patent
Dybing (10) Patent No.: US 9,323,253 B2
(45) Date of Patent: Apr. 26, 2016

(54) PROPORTIONAL FLOW CONTROL OF A FLUID PUMP ASSEMBLY

(71) Applicant: Eaton Corporation, Cleveland, OH (US)

(72) Inventor: Philip James Dybing, Lanesboro, MN (US)

(73) Assignee: Eaton Corporation, Cleveland, OH (US)

( * ) Notice: Subject to any disclaimer, the term of this patent is extended or adjusted under 35 U.S.C. 154(b) by 301 days.

(21) Appl. No.: 14/136,277

(22) Filed: Dec. 20, 2013

(65) Prior Publication Data

US 2014/0174549 A1 Jun. 26, 2014

Related U.S. Application Data

(60) Provisional application No. 61/740,854, filed on Dec. 21, 2012.

(51) Int. Cl.
*F15B 11/04* (2006.01)
*G05D 7/06* (2006.01)
*F15B 11/042* (2006.01)

(52) U.S. Cl.
CPC .......... *G05D 7/0635* (2013.01); *F15B 11/0423* (2013.01); *F15B 2211/20515* (2013.01); *F15B 2211/20523* (2013.01); *F15B 2211/20553* (2013.01); *F15B 2211/6051* (2013.01); *F15B 2211/6057* (2013.01); *F15B 2211/633* (2013.01); *F15B 2211/6336* (2013.01); *F15B 2211/651* (2013.01); *F15B 2211/654* (2013.01); *F15B 2211/6651* (2013.01); *F15B 2211/865* (2013.01); *Y10T 137/0368* (2015.04); *Y10T 137/86027* (2015.04)

(58) Field of Classification Search
CPC ................ F15B 2211/20553; F15B 2211/651; F04B 49/08
USPC ............................................. 60/422, 451, 452
See application file for complete search history.

(56) References Cited

U.S. PATENT DOCUMENTS 5,993,168 A * 11/1999 Erkkilae ................. F04B 49/08 417/213
6,033,188 A *  3/2000 Baldus .................... F04B 49/08 417/222.1
6,308,516 B1  10/2001 Kamada
(Continued)

OTHER PUBLICATIONS

International Search Report and Written Opinion for PCT/US2013/076937 mailed Mar. 13, 2014.

*Primary Examiner* — Thomas E Lazo
(74) *Attorney, Agent, or Firm* — Merchant & Gould P.C.

(57) ABSTRACT

A pump control assembly having a flow control assembly disposed between the first end of a load sensing valve and a fluid pump is disclosed. The flow control assembly may include an orifice, a first valve assembly, and a second valve assembly. When the first valve assembly is in an open position and the second valve assembly is in a first position, fluid passing through the orifice is directed to a fluid reservoir and to the load sensing valve. When the first valve assembly is in a closed position and the second valve assembly is in a second position, all fluid passing through the orifice is directed to the load sensing valve. An electronic controller can be configured to transmit an output current to the first and second valve assemblies in response to an operational parameter of a prime mover supplying power to the fluid pump.

10 Claims, 4 Drawing Sheets

(56) References Cited

U.S. PATENT DOCUMENTS

| | | | | |
|---|---|---|---|---|
| 6,874,318 B1 * | 4/2005 | MacLeod | ................ | F04B 49/08 60/451 |
| 7,341,434 B2 * | 3/2008 | Belser | .................... | F04B 49/08 417/212 |
| 8,435,010 B2 * | 5/2013 | Dybing | .................... | F15B 9/04 417/222.1 |
| 2011/0268587 A1 | 11/2011 | Dybing | | |
| 2012/0233996 A1 | 9/2012 | Quinnell et al. | | |
| 2013/0318957 A1 * | 12/2013 | Hennemann | ............ | E02F 3/964 60/451 |

* cited by examiner

PROPORTIONAL FLOW CONTROL OF A FLUID PUMP ASSEMBLY

RELATED APPLICATIONS

This application claims priority to U.S. Provisional Patent Application Ser. No. 61/740,854, filed Dec. 21, 2012. The entirety of U.S. 61/740,854 is hereby incorporated by reference herein.

BACKGROUND

Fluid systems used in various applications often have requirements that are variable. For example, fluid systems may require variable flow rates and variable fluid pressures. Load sensing pumps can be used to tailor the operation of a pump to meet the variable flow requirements of a given fluid system. A typical load sense pump uses flow and pressure feedbacks in the fluid system to adjust the flow requirements of the pump. The variable nature of fluid systems also places a variable demand on the source used to power the pump. Improvements in pump control and power source management are desired.

SUMMARY

An aspect of the present disclosure relates to a pump control assembly. The pump control assembly includes a fluid pump assembly having a fluid pump and a load sensing valve. The fluid pump includes a fluid inlet and a fluid outlet. The fluid pump includes a variable displacement mechanism. The load sensing valve is adapted to adjust the position of the variable displacement mechanism. The load sensing valve includes a first end and an oppositely disposed second end. An actuator is in fluid communication with the fluid pump assembly.

The pump control assembly also includes a flow control assembly disposed between the first end of the load sensing valve and the fluid pump. In one embodiment, the flow control assembly includes an orifice, a first valve assembly, and a second valve assembly. In one configuration, when the first valve assembly is in an open position and the second valve assembly is in a first position, a portion of the fluid passing through the orifice is directed to the fluid reservoir and another portion of the fluid passing through the orifice is directed to the first end of the load sensing valve. When the first valve assembly is in a closed position and the second valve assembly is in a second position, all fluid passing through the orifice is directed to the first end of the load sensing valve. An electronic control unit in electrical communication with the first and second valve assemblies may also be provided. The electronic control unit can be configured to transmit an output current to the first and second valve assemblies in response to an operational parameter of a prime mover that supplies power to the fluid pump.

Another aspect of the present disclosure relates to a method for actuating a pump control assembly. The method may include the steps of placing the pump control assembly in a normal operational state; receiving a command to actuate an actuator associated with the pump control assembly; and sending a signal to a control valve to activate the actuator. The method may also include commanding a flow control assembly to direct fluid from a system pump through an orifice and to a load sensing valve configured to modulate the pump flow output. In one step a system command is received to reduce or manage fluid flow through the pump based on an operational parameter of a prime mover providing power to the system pump. Another step includes modulating a first valve of the flow control assembly to redirect at least some of the fluid passing through the orifice to a fluid reservoir to reduce fluid flow to the load sensing valve while maintaining pump pressure. The method may also include the step of continuously monitoring the prime mover operational parameter.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
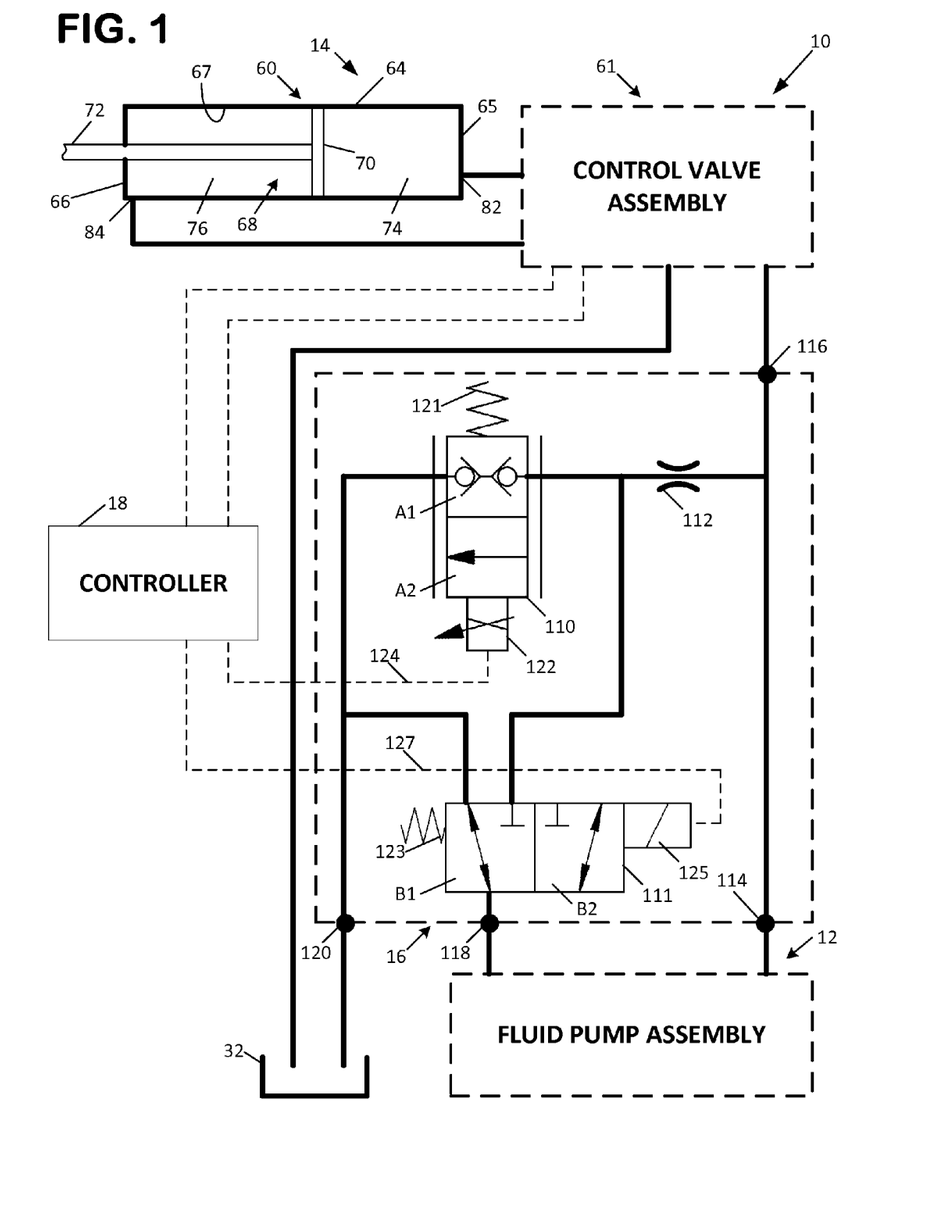
FIG. 1 is a schematic representation of a pump control assembly having exemplary features of aspects in accordance with the principles of the present disclosure.

Referring now to FIG. 1, a pump control assembly 10 is shown. The pump control assembly 10 is adapted to control the output of a fluid pump based on a position of an actuator. In the subject embodiment, the pump control assembly 10 is adapted to reduce flow from the fluid pump by manipulating the load sense line while maintaining pump output pressure to allow a vehicle engine to run at the peak torque curve at the given engine RPM and to prevent the pump load from causing an engine stall. Engine stall can be of particular concern for engines that have been converted to operate on liquid natural gas (LNG) as low end torque output is reduced as compared to an engine using gasoline or diesel fuel. The pump control assembly 10 can also be adapted to prevent spikes in fluid pressure when the actuator reaches its travel limit. In the depicted embodiment, of FIG. 1, the pump control assembly 10 includes a fluid pump assembly 12, an actuator assembly 14, a flow control assembly 14 and an electronic control unit 18.

Fluid Pump Assembly

Figure 3:
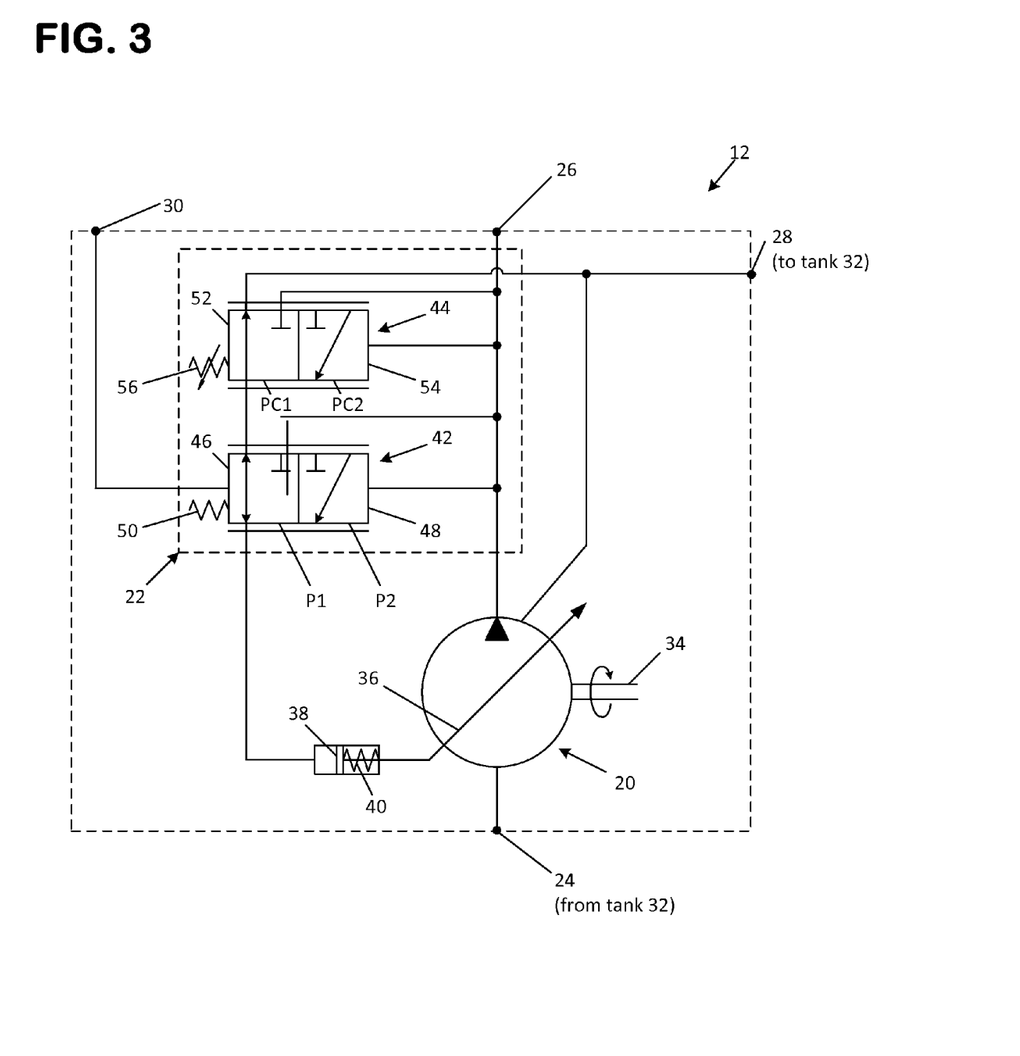
FIG. 3 is a schematic representation of a fluid pump assembly suitable for use in the pump control assembly of FIG. 1.

Referring now to FIGS. 1 and 3, the fluid pump assembly 12 will be described. The fluid pump assembly 12 includes a fluid pump 20 and a load sensing compensator valve assembly 22.

The fluid pump 20 includes a fluid inlet 24, a fluid outlet 26, a drain port 28 and a load sense port 30. The fluid inlet 24 of the fluid pump 20 is in fluid communication with a fluid reservoir 32. The fluid outlet 26 is in fluid communication with the actuator assembly 16. The drain port 28 is in fluid communication with the fluid reservoir 32.

The fluid pump 20 further includes a shaft 34. The shaft 34 is coupled to a power source (e.g., an engine, electric motor, etc.) that rotates the shaft 34. As the shaft 34 rotates, fluid is pumped from the fluid inlet 24 to the fluid outlet 26.

The fluid pump 20 is a variable displacement fluid pump. As a variable displacement pump, the fluid pump 20 includes a variable displacement mechanism 36. In the depicted embodiment, the fluid pump 20 is an axial piston pump and the variable displacement mechanism 36 is a swash plate. The swash plate 36 is movable between a neutral position and a full stroke position. In the neutral position, the displacement of the fluid pump 20 is about zero. At zero displacement, no fluid passes through fluid pump 20 as the shaft 34 rotates. In the full stroke position, a maximum amount of fluid passes through the fluid pump 20 as the shaft 34 rotates.

The fluid pump 20 includes a control piston 38 and a biasing member 40. The control piston 38 and the biasing member 40 act against the swash plate 36 to adjust the position of the swash plate 36. The control piston 38 is adapted to adjust the position of the swash plate 36 from the full stroke position to the neutral position. The control piston 38 is in selective fluid communication with the fluid outlet 26 of the fluid pump 20. The control piston 38 is in fluid communication with the load sensing compensator valve assembly 22.

The biasing member 40 is adapted to bias the fluid pump 20 toward the full stroke position. The biasing member 40 includes a spring that biases swash plate 36 toward the full stroke position.

The load sensing compensator valve assembly 22 is adapted to vary the flow of fluid and the pressure of the fluid from the fluid pump 20 as the flow and pressure requirements of the system employing the fluid pump 20 vary. In the depicted embodiment, the load sensing compensator valve assembly 22 includes a load sense valve 42 and a pressure limiting compensator 44. In one embodiment, the load sensing compensator valve assembly 22 is external to the fluid pump 20. In another embodiment, the load sensing compensator valve assembly 22 is integral to the fluid pump 20.

The load sensing valve 42 provides selective fluid communication between the control piston 38 and either the drain port 28 or the fluid outlet 26 of the fluid pump 20. In the depicted embodiment, the load sensing valve 42 is a proportional two-position, three-way valve. In a first position P1, the load sensing valve 42 provides fluid communication between the control piston 38 and the drain port 28 so that fluid acting against the control piston 38 is drained to the fluid reservoir 32 through the drain port 28. With the load sensing valve 42 in this first position P1, the swash plate 36 is biased toward the full stroke position by the biasing member 40.

In a second position P2, the load sensing valve 42 provides fluid communication between the control piston 38 and the fluid outlet 26 so that pressurized fluid acts against the control piston 38. With the load sensing valve 42 in this second position P2, the control piston 38 acts against the biasing member 40 to move the swash plate 36 toward the neutral position.

The load sensing valve 42 includes a first end 46 and an oppositely disposed second end 48. The first end 46 is in fluid communication with the load sense port 30. Fluid from the load sense port 30 acts against the first end 46 to actuate the load sensing valve 42 to the first position. In the depicted embodiment, a light spring 50 also acts against the first end 46 of the load sensing valve 42 to bias the load sensing valve 42 to the first position P1. In one embodiment, the combined load against the first end 46 of the load sensing valve 42 is equal to the pressure of the fluid from the load sensing port 30 plus about 200 psi to about 400 psi.

The second end 48 of the load sensing valve 42 is in fluid communication with the fluid outlet 26 of the fluid pump 20. When the fluid pressure acting on the second end 48 is greater than the fluid pressure acting on the first end 46, the control piston 38 actuates the swash plate 36 in a direction toward the neutral position, thereby decreasing the amount of fluid displaced by the fluid pump 20.

The pressure limiting compensator 44 is a type of pressure relieving valve. In the depicted embodiment, the pressure limiting compensator 44 is a proportional two-position, three-way valve. The pressure limiting compensator 44 includes a first end 52 and an oppositely disposed second end 54. A heavy spring 56 acts against the first end 52 of the pressure limiting compensator 44 while fluid from the fluid outlet 26 acts against the second end 54.

The pressure limiting compensator 44 includes a first position PC1 and a second position PC2. In the first position PC1, the pressure limiting compensator 44 provides a fluid passage to the drain port 28. When the pressure limiting compensator 44 is in the first position PC1 and the load sensing valve 42 is in the first position P1, fluid acting against the control piston 38 is drained to the fluid reservoir 32 through the drain port 28. With the pressure limiting compensator 44 in this first position PC1 and the load sensing valve 42 in the first position P1, the swash plate 36 is biased toward the full stroke position by the biasing member 40.

In the second position PC2, the pressure limiting compensator 44 provides fluid communication between the control piston 38 and the fluid outlet 26 so that pressurized fluid acts against the control piston 38. With the pressure limiting compensator 44 in this second position PC2, the control piston 38 acts against the biasing member 40 to move the swash plate 36 toward the neutral position.

As fluid pressure in the fluid outlet 26 rises and approaches a load setting of the heavy spring 56, the pressure limiting compensator 44 shifts toward the second position PC2 allowing fluid to pass to the control piston 38. As fluid acts against the control piston 38, the position of the swash plate 36 is moved toward the neutral position. This movement continues until the amount of fluid at the fluid outlet 26 of the fluid pump 20 is low enough to maintain the system pressure at the load setting of the heavy spring 56 or until the fluid pump 20 is in the neutral position. In one embodiment, the heavy spring 56 provides a load setting of about 2500 psi to about 3500 psi system pressure.

Actuator Assembly

Figure 2:
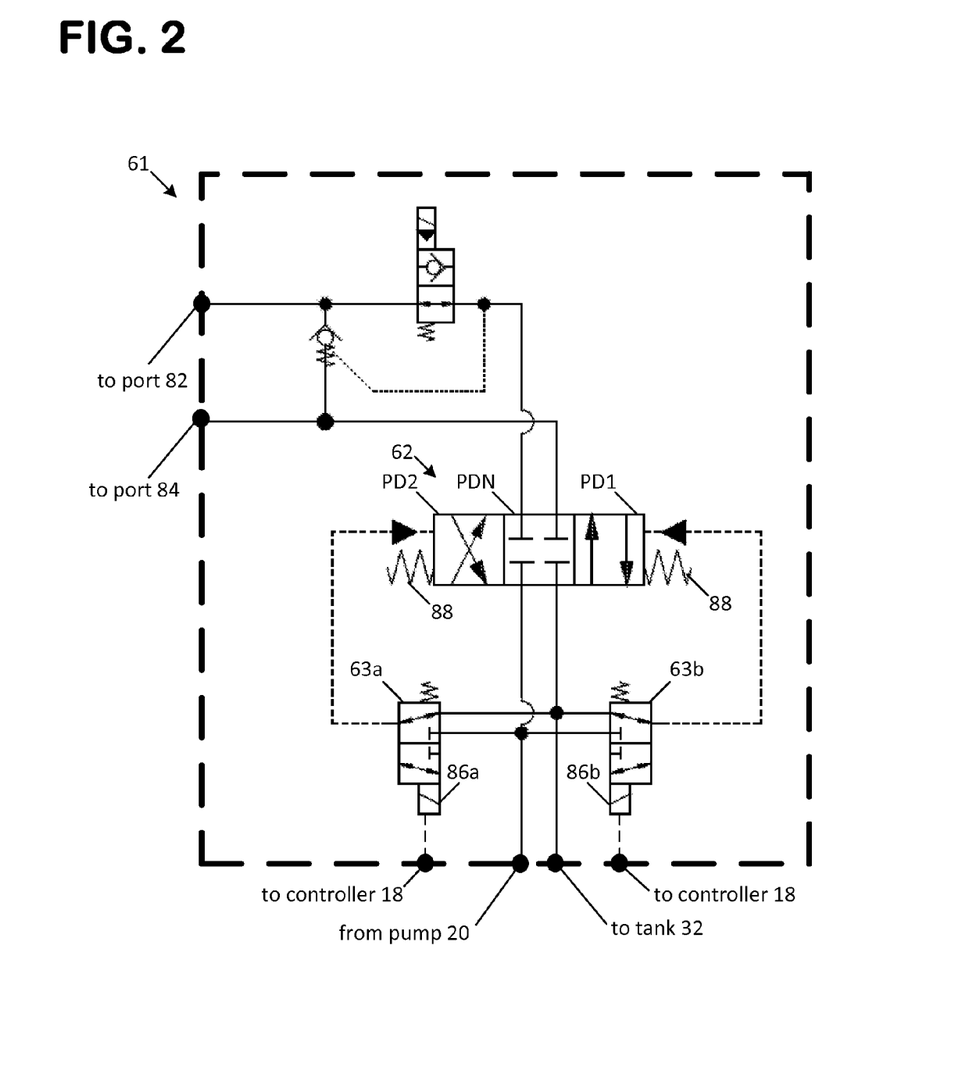
FIG. 2 is a schematic representation of a work circuit suitable for use in the pump control assembly of FIG. 1.

Referring now to FIGS. 1 and 2, the actuator assembly 14 includes an actuator 60 and a control valve assembly 61 having a directional control valve 62 and two pilot valves 63a, 63b. The actuator 60 can be a linear actuator (e.g., a cylinder, etc.) or a rotary actuator (e.g., a motor, etc.). In the subject embodiment, the actuator 60 is a linear actuator.

The actuator 60 includes a housing 64. The housing 64 includes a first axial end 65 and an oppositely disposed second axial end 66.

The housing 64 defines a bore 67. A piston assembly 68 is disposed in the bore 67. The piston assembly 68 includes a piston 70 and a rod 72. The bore 67 includes a first chamber 74 and a second chamber 76. The first chamber 74 is disposed on a first side of the piston 70 while the second chamber 76 is disposed on an oppositely disposed second side of the piston 70.

The actuator 60 includes a first control port 82 and a second control port 84. The first control port 82 is in fluid communication with the first chamber 74 while the second control port 84 is in fluid communication with the second chamber 76.

The directional control valve 62 is in fluid communication with the actuator 60. In the depicted embodiment, the direction control valve 62 is a pilot operated, three-position, four-way valve. The direction control valve 62 includes a first position PD1, a second position PD2 and a closed center neutral position PDN.

In the first position PD1, the direction control valve 62 provides fluid communication between the fluid pump 20 and the first control port 82 and between the second control port 84 and the fluid reservoir or tank 32. In the depicted embodiment, the first position PD1 results in extension of the piston assembly 68 from the housing 64. In the second position PD2, the direction control valve 62 provides fluid communication between the fluid pump 20 and the second control port 84 and between the first control port 82 and the fluid reservoir. In the depicted embodiment, the second position PD2 results in retraction of the piston assembly 68.

In the depicted embodiment, the directional control valve 62 is actuated by the pilot valves 63a, 63b which are in turn actuated by solenoid valves 86a, 86b that are in communication with an electronic controller 18. A plurality of centering springs 88 is adapted to bias the directional control valve 62 to the neutral position PN1.

Flow Control Valve Assembly

Referring now to FIG. 1, the flow control valve assembly 16 will be described. The flow control valve assembly 16 is adapted to control displacement of the pump 20 as needed, which in turn controls the torque input required by the shaft 34. By controlling the torque required to drive the pump 20, the pump output flow can be adjusted to run on the peak or optimum torque on the engine, or other prime mover such as an electric motor, to prevent stall out regardless of the output pressure of the pump 20. As shown, the flow control valve assembly 16 includes a first valve assembly 110, an orifice 112, and a second valve assembly 111. In one embodiment, the orifice 112 is configured to provide a false pressure drop in the load sense line and can be configured to cause a pressure drop of about 300 psi at a flow through rate of two gallons per minute. The pressure drop of the orifice 112 can be configured to match the pump pressure and margin pressure such that the pump naturally reduces flow as flow increases through the orifice 112.

In the depicted embodiment, the flow control valve assembly 16 includes an inlet 114, an outlet 116, a load sense passage 118 and a drain passage 120. The inlet 114 is in fluid communication with the fluid outlet 26 of the fluid pump 20. The outlet 116 is in fluid communication with the directional control valve 62 and the pilot valves 63a, 63b of the actuator assembly 14. The load sense passage 118 is in fluid communication with the load sensing compensator valve assembly 22. The drain passage 120 is in fluid communication with the fluid reservoir 32.

The first valve assembly 110 provides a flow path from the fluid outlet 26 of the fluid pump 20 via orifice 112 to both the reservoir 32 via port 120 and the second valve assembly. The orifice 112 causes a pressure drop in the pumped fluid delivered to the load sense port 30 regardless of the position of the first and second valve assemblies 110, 111. In the depicted embodiment, the first valve assembly 110 is a proportional two-position, two-way solenoid valve. In a first position A1, pumped fluid from outlet 26 is blocked from passing through the first valve assembly 110 and is thereby forced directly to the second valve assembly 111 after passing through orifice 112. In a second position A2, the first valve assembly 110 provides for fluid communication from the pump outlet 26 via orifice 112 to both the second valve assembly 111 and the reservoir 32, as stated above. A spring 121 biases the first valve assembly 110 to the first position A1.

The first valve assembly 110 is actuated by a solenoid 122 in response to an output current 124 from the electronic control unit 18 (shown in FIG. 1). The output current 124 is sent from the electronic control unit 18 in response to the operational parameters of the prime mover, such as engine torque demand and/or engine RPM. As the first valve assembly 110 is a proportional valve, the flow of fluid through the first valve assembly 110 is proportional to the output current 124 received by the solenoid 122 from the electronic control unit 18. Therefore, the flow of fluid to the load sense port 30 is proportional to the output current 124.

The second valve assembly 111 provides selective fluid communication between the fluid outlet 26 of the fluid pump 20 and the first valve assembly 110 via orifice 112. In the depicted embodiment, the first valve assembly 110 is a two-position, two-way solenoid valve. In a first position B1, the second valve assembly 111 blocks pumped fluid from outlet 26 from directly communicating with the load sense port 30 and instead drains the load sense port 30 directly to tank via port 120, allowing the pump to remain at zero flow and low standby pressure. In a second position B2, the second valve assembly 111 provides full fluid communication to the load sense port 30 from the pumped fluid outlet 26 via orifice 112, and blocks flow to the drain port 120. A spring 123 biases the second valve assembly 111 to the first position B1.

The second valve assembly 111 is actuated by a solenoid 125 in response to an output current 127 from the electronic control unit 18 (shown in FIG. 1). The output current 127 is sent from the electronic control unit 18 in response to the operational parameters of the prime mover, such as engine torque demand and/or engine RPM.

As the load sense port 30 is in fluid communication with the first end 46 of the load sensing valve 42 of the fluid pump assembly 12 and as the load sensing valve 42 is used to adjust the position of the swash plate 36, which controls the flow of fluid from the fluid pump 20, the flow of fluid from the fluid pump 20 is proportional to the output current 124. As will be described in greater detail subsequently, the output current 124 can be programmed to prevent engine stalling and pressure spikes.

Method of Operation

Referring now to FIGS. 1-4, a method 1000 of operating the pump control assembly 10 will be described. It is noted that although the figures diagrammatically show steps in a particular order, the described procedures are not necessarily intended to be limited to being performed in the shown order. Rather at least some of the shown steps may be performed in an overlapping manner, in a different order and/or simultaneously.

Figure 4:
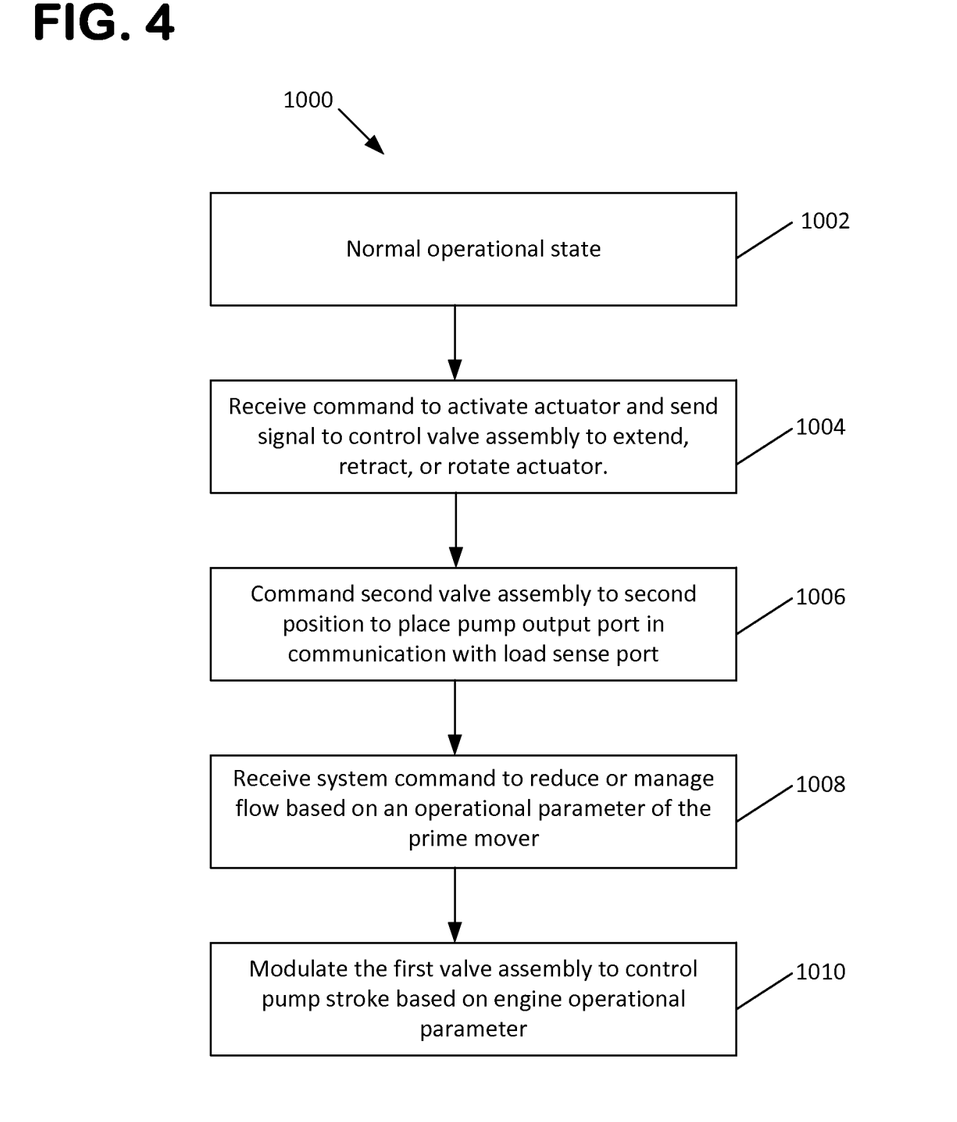
FIG. 4 is a representation of a method for operating the pump control assembly of FIG. 1.

In step 1002, the system is operating in a normal operating condition with no demand to move the actuator 60 wherein the solenoids 122, 125 to the first and second valve assemblies are de-energized and in the position shown in FIG. 1. In this condition, the pump 20 is at low standby because the load sense signal is drained to the tank via port 120.

In a step 1004, a command is received to activate the actuator 60 whereby pumped fluid is required. Step 1004 also includes activating the control valve assembly 61 wherein a signal would be sent to solenoid 86a to place the actuator port 84 in fluid communication with pump 20.

In a step 1006, the second control valve assembly is commanded to the second position B2 whereby the pump margin collapses and pump flow is generated by virtue of pumped fluid flowing through orifice 112 and the second valve assembly 111 to the load sense port 30. Over time, the pump 20 will increase stroke to full flow as the margin setting to the load sense controller (e.g. 200-300 psi) will not be met as there is a direct connection between the pump pressure port 26 to the load sense port 30 with little restriction other than through orifice 112.

In a step 1008, a command is received to reduce or manage system flow based on an operational parameter of the prime mover, for example a vehicle engine or electric motor. If the resistance to flow in the system causes the pressure at full flow to exceed the torque drive capabilities of the prime mover, the flow control assembly 16 becomes active. During this time, the electronic controller 18 is constantly monitoring engine torque demand or simply engine rotational speed (i.e. engine RPM). If, after steps 1004 and 1006 have been initiated, the engine RPM drops below a prescribed value, this may be an indication that the engine is about to stall out.

In a step 1010, the controller sends a signal to the first valve assembly 110 to open proportionally to prevent the prime mover from exceeding the operational parameter for the prime mover. In other words, the first valve assembly 110 can be opened proportionally to prevent the vehicle engine from dropping below a prescribed engine rotational speed threshold. In operation, the first valve assembly 110 continues to open until the flow through the first valve assembly 110 to the reservoir 32 causes a sufficient pressure drop through orifice 112 to match the pump margin. As the first valve assembly 110 continues to open, the pump margin continues to increase thereby causing the pump to reduce displacement and preventing engine stall out. While the system is in this mode, the controller 18 will continue to monitor the engine RPM, or another parameter, and modulate the first valve assembly 110 to ensure that the engine will not stall out.

It is also noted that the flow control valve assembly can be configured to slow down an actuator to prevent shock loads. For example, the flow control valve assembly can operate to reduce pump flow to a cylinder just before it hits the end of its stroke in the same manner pump flow is reduced to prevent engine stall. A position sensor may be incorporated into the system to aid in such an operation. An example of a system including a position sensor for which the disclosed flow control valve assembly may be utilized is U.S. patent application Ser. No. 12/770,261, filed on Apr. 29, 2010 and entitled CONTROL OF A FLUID PUMP ASSEMBLY. U.S. Ser. No. 12/770,261 is hereby incorporated by reference herein in its entirety. The disclosed flow control valve assembly of this disclosure can be used to replace the ramping valve assembly of U.S. Ser. No. 12/770,261 and configured to perform both functions of preventing engine stall and preventing shock loads at an actuator.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:
1. A pump control assembly comprising:
 (a) a fluid pump assembly including:
  i. a fluid pump having a fluid outlet and a fluid inlet in communication with a fluid reservoir, the fluid pump including a variable displacement mechanism;
  ii. a load sensing valve adapted to adjust the position of the variable displacement mechanism, the load sensing valve having a first end and an oppositely disposed second end;
 (b) an actuator in fluid communication with the fluid pump assembly;
 (c) a flow control assembly disposed between the first end of the load sensing valve and the fluid pump including:
  i. an orifice, a first valve assembly, and a second valve assembly;
  ii. wherein when the first valve assembly is in an open position and the second valve assembly is in a first position, a portion of the fluid passing through the orifice is directed to the fluid reservoir and another portion of the fluid passing through the orifice is directed to the first end of the load sensing valve;
  iii. wherein when the first valve assembly is in a closed position and the second valve assembly is in a second position, all fluid passing through the orifice is directed to the first end of the load sensing valve; and
 (d) an electronic control unit in electrical communication with the first and second valve assemblies, wherein the electronic control unit transmits an output current to the first and second valve assemblies in response to an operational parameter of a prime mover that supplies power to the fluid pump.

2. The pump control assembly of claim 1, wherein the first valve assembly includes a proportional solenoid.

3. The pump control assembly of claim 1, wherein the prime mover is a vehicle engine.

4. The pump control assembly of claim 3, wherein the operational parameter of the prime mover is a minimum rotational speed threshold of the engine.

5. The pump control assembly of claim 3, wherein the electronic control unit modulates the position of the first valve assembly to prevent the prime mover from falling below the operational parameter.

6. A method of operating a pump control assembly comprising the steps of:
 (a) placing the pump control assembly in a normal operational state;
 (b) receiving a command to actuate an actuator associated with the pump control assembly;
 (c) sending a signal to a control valve to activate the actuator;
 (d) commanding a flow control assembly to direct fluid from a system pump through an orifice and to a load sensing valve configured to modulate the pump flow output;
 (e) receiving a system command to reduce or manage fluid flow through the pump based on an operational parameter of a prime mover providing power to the system pump; and
 (f) modulating a first valve of the flow control assembly to redirect at least some of the fluid passing through the orifice to a fluid reservoir to reduce fluid flow to the load sensing valve while maintaining pump pressure.

7. The method of operating a pump control assembly of claim 6, further comprising the step of continuously monitoring the prime mover operational parameter.

8. The method of operating a pump control assembly of claim 7, wherein the step of continuously monitoring the prime mover operational parameter prime mover includes monitoring a vehicle engine rotational speed.

9. The pump control assembly of claim 8, wherein the step of modulating a first valve of the flow control assembly includes modulating the first valve to prevent the engine from falling below the operational parameter of the prime mover.

10. The pump control assembly of claim 9, wherein the step of modulating a first valve of the flow control assembly includes modulating the first valve to prevent the engine from falling below a minimum rotational speed threshold.

* * * * *

UNITED STATES PATENT AND TRADEMARK OFFICE
CERTIFICATE OF CORRECTION

| | | |
|---|---|---|
| PATENT NO. | : 9,323,253 B2 | Page 1 of 1 |
| APPLICATION NO. | : 14/136277 | |
| DATED | : April 26, 2016 | |
| INVENTOR(S) | : Philip James Dybing | |

It is certified that error appears in the above-identified patent and that said Letters Patent is hereby corrected as shown below:

Claim 1 at (c)(iii) should be changed from "second valve assembly" to --first valve assembly--

Signed and Sealed this
Sixth Day of August, 2019

Andrei Iancu
*Director of the United States Patent and Trademark Office*